United States Patent [19]

Cok

[11] Patent Number: 5,414,642
[45] Date of Patent: May 9, 1995

[54] METHOD AND APPARATUS FOR COMBINING DATA SETS IN A MULTIPROCESSOR

[75] Inventor: Ronald S. Cok, Rochester, N.Y.

[73] Assignee: Eastman Kodak Company, Rochester, N.Y.

[21] Appl. No.: 935,500

[22] Filed: Aug. 26, 1992

[51] Int. Cl.6 .................................................. G06F 3/00
[52] U.S. Cl. ..................... 364/514; 395/800
[58] Field of Search ................ 395/27, 800, 375, 200; 364/723, 724.1, 741, 514; 370/99, 85.15

[56] References Cited

U.S. PATENT DOCUMENTS

| | | | |
|---|---|---|---|
| 4,459,664 | 7/1984 | Pottier et al. | 395/325 |
| 4,539,637 | 9/1985 | DeBruler | 395/650 |
| 4,855,684 | 12/1989 | Austin | 395/650 |
| 4,855,903 | 8/1989 | Carleton et al. | 395/325 |
| 4,942,517 | 7/1990 | Cok | 395/800 |
| 4,985,830 | 1/1991 | Atac et al. | 395/200 |
| 5,036,459 | 7/1991 | den Haan et al. | 395/200 |
| 5,072,371 | 10/1991 | Benner et al. | 395/200 |

Primary Examiner—Eric Coleman
Assistant Examiner—L. Donaghue
Attorney, Agent, or Firm—Thomas H. Close

[57] ABSTRACT

A system that determines whether a multi-processor operation is possible without data set expansion by comparing the size of the data sets and the position of elements of the data sets, the sampling frequency of the data sets and the amount of overlap of the data sets among the processors. If all of the conditions are not met the operation cannot proceed. If the last condition only is not met, the size of the overlap necessary to allow the operation to proceed can be determined. If sufficient memory space for the expansion of the subsets by exchanging the needed elements is available, the operation can proceed after the communication of the data sets among the processors in accordance with the required expansion.

13 Claims, 5 Drawing Sheets

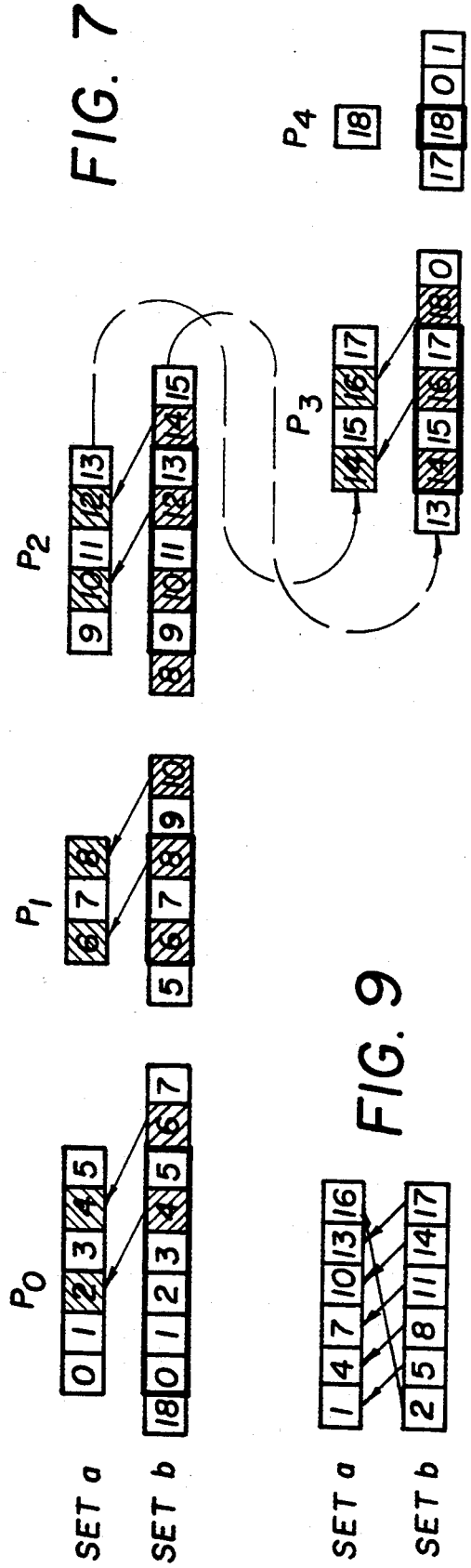
FIG. 7  FIG. 8  FIG. 9
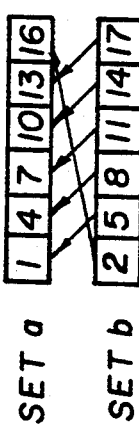

METHOD AND APPARATUS FOR COMBINING DATA SETS IN A MULTIPROCESSOR

BACKGROUND OF THE INVENTION

1. Field of the Invention

The present invention is directed to a method and apparatus for determining whether a sampled data set, distributed over processors in a ring configuration, can be combined using a data combining operation, such as interpolation, without requiring data redistribution over the processors and the communication overhead required for such redistribution and, more particularly to a system which checks to determine whether four conditions exist before the combining operation can proceed. The term combination or combining when used in the present application in reference to data sets refers to any operation performed on data sets in which the elements of one data set are associated with elements of another data set, for example any mathematical operation such as interpolation or correlation between the elements of two data sets, or any arithmetical operation such as addition or subtraction between two data sets.

2. Description of the Related Art

Sampled data sets can be distributed over processors in a ring-connected distributed-memory parallel computer. A sampled data set is one whose elements are sampled at a constant frequency over a contiguous subset of an original data set. Each original data set is distributed in a linear fashion over the processors.

Distributed-memory parallel computers are an efficient apparatus for many computing problems having sampled data sets. These computers utilize multiple processors, each of which have a separate, local memory which is not accessible to any of the other processors. The processors can communicate with each other through interprocessor communication links. The number of processors in such a computer can often be extended without limit. However, the performance of such a computer is limited by the effort of communicating information between the processors so that, at some point, the performance of a large computer with many processors will be constrained by the interprocessor communication bandwidth.

Such computers are most efficient when computing on data sets which are distributed over the various processors and which do not require much communication. In such a case, each processor in the computer will process a local subset of the larger data set. Since each local subset is processed at the same time by each of the many processors within the computer, the overall processing time is greatly reduced. The actual improvement in processing time over a conventional, single-processor computer will depend on the number of processors (and the concomitant local data subset size) and on any communication overhead the computer may experience.

Tasks which require the combination of corresponding data elements from different data sets which are distributed in the same way do not require any interprocessor communication. All the data elements needed by each processor are stored within its local memory. Unfortunately, many tasks are not this simple. For tasks in which the data elements to be combined are not stored in the same processor, each processor must communicate with other processors to get the necessary information needed for the local computation. This communication limits the performance a computer may achieve.

Ring-connected processor arrays are particularly well suited to distributing linear data sets. When distributed over a ring of processors, each data set is divided into small one dimensional local subsets, each of which is stored contiguously in the processors of the ring. Such distributions can also be extended into two dimensions using a mesh or toroidally connected processor array and a two dimensional data set. An example of a one dimensional data set might be a sequence of samples taken of a time varying signal. An example of a two dimensional data set is a digital image.

The total communication overhead that a computer may encounter when combining data stored in separate processors may be reduced by storing data redundantly within the various processors. If some piece of data is likely to be needed several times, it can be stored locally within every processor that needs it. This reduces the total amount of communication at the expense of additional storage. Linear data sets are often locally correlated so that operations on the data elements tend to involve other nearby data elements, that is, the operations are done within a local neighborhood of each element. When the data set is distributed over a ring of processors, this implies that the interprocessor communication will tend to be local as well. Thus, the computer's efficiency will be high since local communication over a distributed network requires less interprocessor communication than global or long-distance communication.

When data elements are locally correlated within a one-dimensional set, redundant data storage within the processors is particularly effective. For example, consider a five-element convolution. Each data element must be accessed five times to compute the convolution. For an element on the edge within one processor, two elements from a neighboring processor must be accessed to compute the convolved value. Thus, it may be much more efficient for two neighboring processors to exchange a copy of their border elements with each other and store the input values locally. Once this has been done, each processor then has all the necessary data to perform its computation without any additional communication. Indeed, operations with these data elements can be done repeatedly, so long as the computing task does not require any new data from farther away and the data themselves are not changed.

Because the redundant storage of data in these circumstances is so useful, data sets are often stored in this "expanded" form, that is, with some data overlap between processors. Any local operation can be performed without requiring additional communication, so long as the original data is not changed (in which case the data exchange would have to be repeated) or the operation does not require data which is not locally stored.

To determine whether an operation can be performed on a data set, the computation algorithm requirements must be compared to the size of the data overlap. In many cases, this is very straightforward. For example, a convolution can be performed if one half the kernel size is less than or equal to the overlap.

It can also happen, however, that operations are not performed on a single data set but might combine two sets or portions of two data sets. For example, two arrays might be summed element by element. In this case if the data sets are distributed identically, the operation is straightforward and no interprocessor communication is necessary since every processor contains corresponding portions of each data subset. If the positions of the elements of the data sets to be combined do not correspond, however, the situation is much more complex.

There are two ways in which this might occur. First, the sampled data sets might be taken from different portions of the data sets. For example, the first sampled data set might be taken from the first half of a set, and the second sampled data set might be taken from the second half. Second, the corresponding elements of the two sampled sets might be relatively offset with respect to each other, that is the first element of one sampled set might correspond with the second element of a second set, or vice versa. It is also possible that both of these circumstances might apply.

SUMMARY OF THE INVENTION

It is an object of the present invention to determine whether a parallel multi-processor operation in which data sets are combined can be performed in parallel by a ring connected set of processors.

It is also an object of the present invention to determine whether data exchange or redistribution is necessary to perform the operation.

It is an additional object of the present invention to determine whether communication is necessary to allow the operation to be performed.

It is a further object of the present invention to allow operations that do not require communication to proceed.

It is another object of the present invention to determine the required expansion of the data sets where the overlap required to allow the operation to proceed is determined.

It is an additional object of the present invention to determine whether data sets distributed over a ring-connected, distributed-memory parallel computer can be combined without any interprocessor communication and without redistributing the sample data sets over the multi-processor.

The above objects can be attained by a system that determines whether a multi-processor operation can be performed without data set expansion or interprocessor communication by comparing the size and positions of elements of the data sets, the sample frequency of the data sets and the amount of overlap of the data sets among the processors. The operation is possible if: 1) the data sets are identically distributed, that is, if corresponding subsets are stored in the processors; 2) the sample data sets have the same number of elements; 3) the sampling frequency for each of the sample data sets are identical; and 4) the product of the sampling frequency and an offset plus a difference between the first two points within each data set are less than or equal to a left-side overlap (if the sum is less than zero) and less than or equal to a right-side overlap (if the sum is greater than zero). If the operation cannot be performed because of a failure to meet condition 4) step 4 also determines the amount of data set expansion required in each processor. If the maximum expansion is possible because sufficient memory is available, the expansion of all data sets by the maximum can be performed and the operation can proceed.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 7 and 8 depict element overlap between processors; and

FIG. 9 depicts the operation occurring in FIG. 8.

DESCRIPTION OF THE PREFERRED EMBODIMENTS

The invention is a system for determining whether sampled data sets (that is, subsets of an original data set) distributed over a ring interconnected multiprocessor can be combined without any interprocessor communication. The variable p is used to denote the number of processors in any such ring. A data set of n elements can be distributed over a ring of p processors by allocating n/p data elements to each of p−1 processors with the pth processor having the remainder of the data. The data of any one distributed set that is stored within one processor is referred to here as a local subset. It is not necessary, however, that every processor have the same amount of data, that is, the local subsets within different processors can be of different sizes. The method described here will work for any amount and distribution of data whatsoever, even if some processors have no data at all. The method also works for any number of processors.

Figure 1:
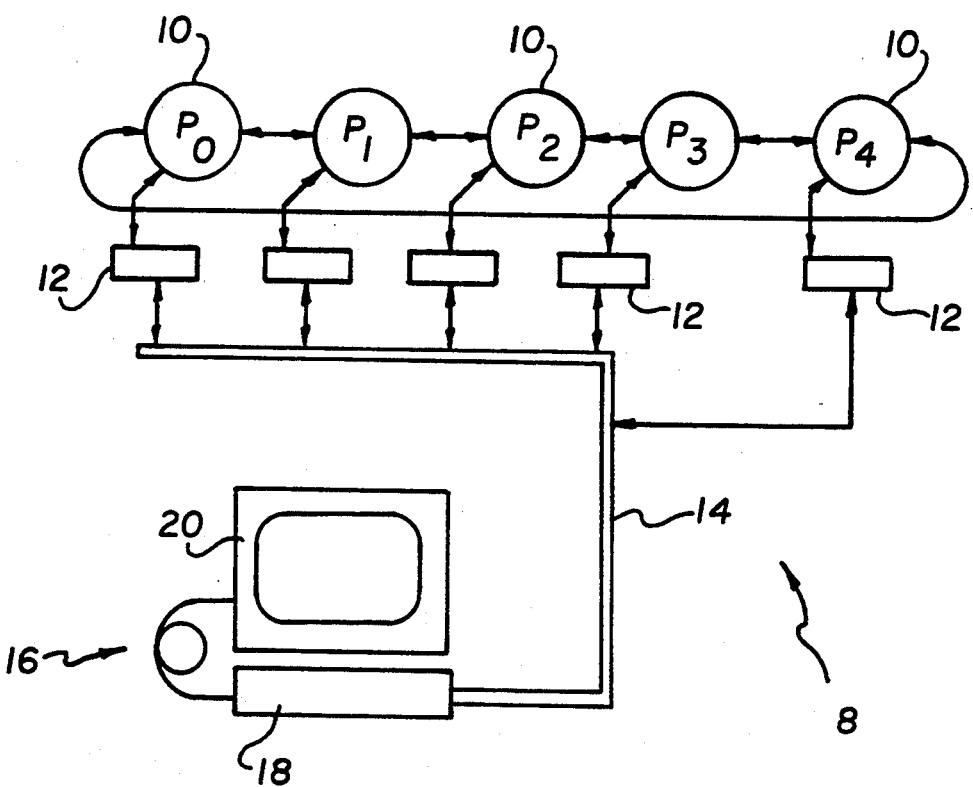
FIG. 1 illustrates a ring-connected distributed-memory parallel computer system 8.

A 5-node ring multiprocessor is shown in FIG. 1 and includes processors 10, labeled $P_0$–$P_4$, which receive an input data set from input/output interface units 12 over a communication channel 14 from a computer system 16 including a central processing unit 18 and associated memory along with a display 20. Each processor 10 includes a primary processor and several direct memory access processors or channels which provide the ring interconnections although these details are not shown. The details of the architecture and construction of this type ring connected in a more complex toroid relationship can be found in U.S. Pat. No. 4,942,517 incorporated by reference herein.

Figure 2:
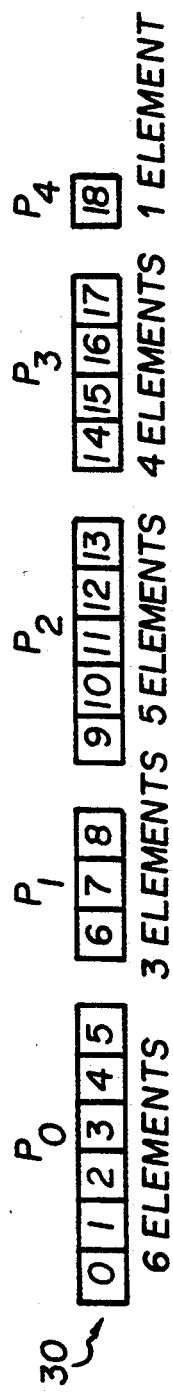
FIG. 2 depicts a data set 30 having elements 0–18 distributed over five processors $P_0$–$P_4$.
Figure 3:
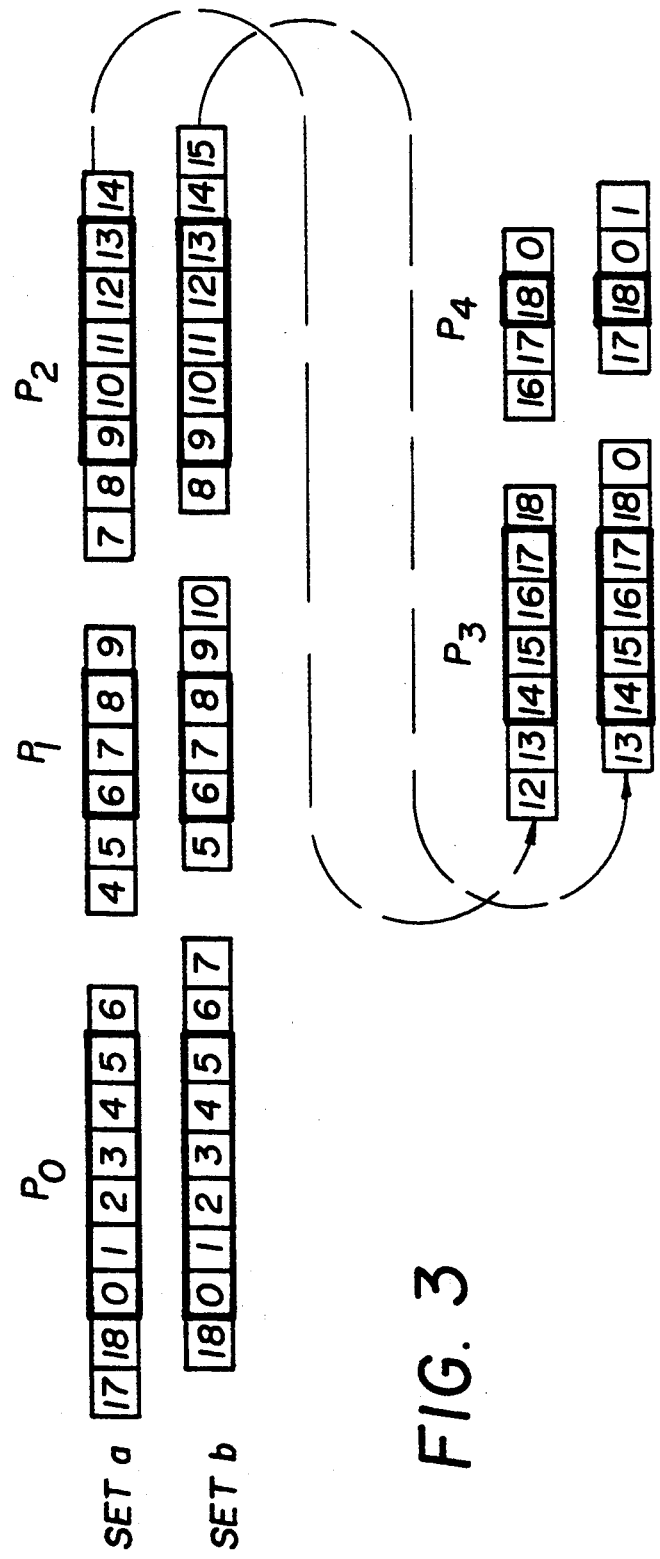
FIG. 3 depicts overlap of data set elements within processors.

One possible distribution for a data set 30 with 19 elements within the processor ring of FIG. 1 is shown in FIG. 2. Each element is illustrated with its value and, to enhance the clarity of the illustration and discussion, each data element value is chosen to match its position in the data set. A data set can also be expanded, that is, the elements on the edge of each subset whose neighboring elements are in another processor can be stored redundantly in both processors. FIG. 3, in Set a, illustrates the same data as shown in FIG. 2 stored with a redundant element overlap of two elements on the left and one element on the right while Set b shows an overlap of one element on the left and two elements on the right. The local values or the original data subsets for each processor are designated by a darkly bordered box. Note that the data elements at the beginning and end of the data set wrap around the ring.

Any source data set or subset whose needed elements correspond directly with those of the destination data set will not need to be expanded. This is obviously true if one of the sources and the destination are the same data sets, that is, one of the source data sets overwrites the destination. (Two data sets or subsets correspond if their elements are in the same relative position in each processor.) All of the other data sets must be expanded relative to the destination and any matching source data set.

Figure 4:
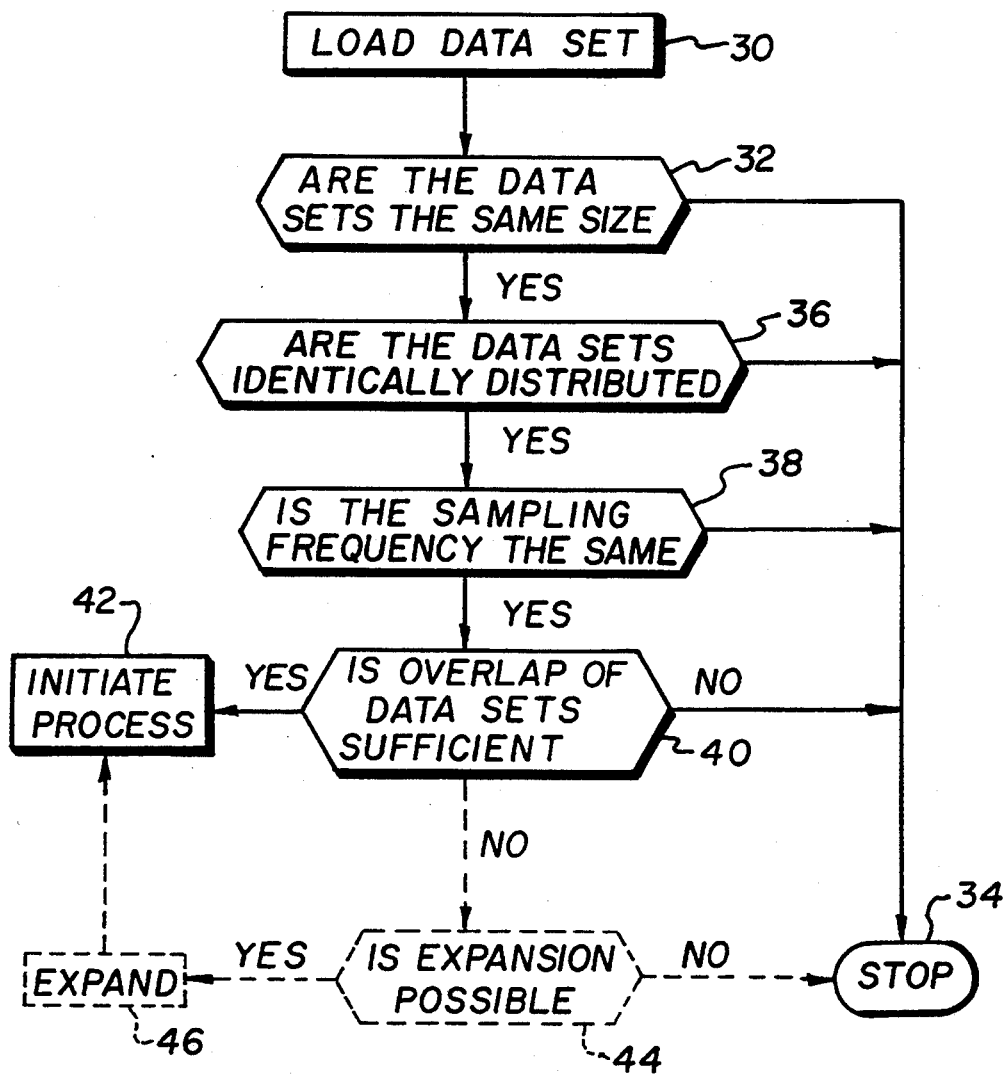
FIG. 4 depicts the operations of the present invention.

The present invention includes a method for determining if any sampled subset of an expanded data set distributed over a ring multiprocessor can be combined with any other without redistribution. An expanded data set is a data set in which subsets allocate to each processor have elements which duplicate elements stored in neighboring processors. A data set is generally expanded by processor 18 prior to loading the data set into processors 10. A redistribution of a data set is a transfer of data elements between processors 10 after the data set is loaded into processors 10. The method, as illustrated in FIG. 4, is composed of four requirements or tests that must, in general, be met if different sampled data sets are to be properly combined. This method can be performed by the computer system 16 illustrated in FIG. 1 or can be performed by one of the processors 10 of the ring. The determinations as to whether the operation can be performed can be made before the data elements of the data sets, such as that illustrated in FIGS. 2-3b, are conventionally loaded into each of the processors 10. However, this approach can be impractical in a production environment since overall production efficiency can suffer because the loading is a series operation while expansion using interprocessor communication after loading is in parallel. As can be seen, the processors 10 can also be conventionally loaded 30 as illustrated in FIG. 4 prior to the determination. If loaded prior to the determinations and if the determinations indicate further expansion is necessary, the further expansion can be accomplished by either the processor 18 loading the additional elements into the processors 10 or the processors 10 performing a conventional redistribution of the elements that are needed elsewhere. If not loaded prior to the determinations, any necessary expansion can be performed by processor 18 prior to loading the expanded data sets into processors 10.

The first requirement 32 is that the data sets have the same size. A simple total element number comparison between the data sets will perform this test. If this identity in size was not required, two data sets could not be combined since not all of the elements could correspond. One set or another would have elements remaining without a matching element in the other data set. For example, the data set of FIG. 2 which has 18 elements could not be used in an arithmetic operation with a data set having 19 elements. If any of the requirements are not met the combining operation can be stopped 34 or not started.

Figure 5:
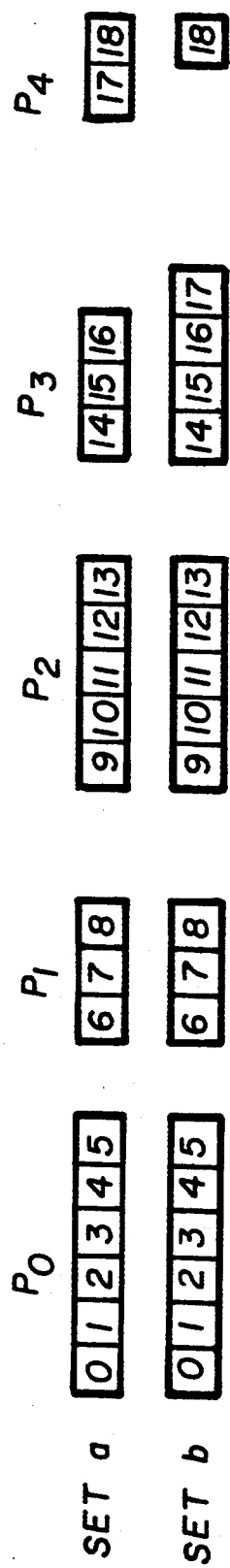
FIG. 5 depicts original data sets that are not distributed identically.

The second requirement 36 is that the original or core data sets be identically distributed before expansion. The data elements do not have to be distributed evenly as shown in FIG. 3 where processor $P_1$ contains less elements than processor $P_2$. If identically distributed, any two sets of the same size can be directly combined element by element because all of the corresponding elements are stored in the same processor. FIG. 5 illustrates two data sets which are distributed identically except for processors $P_3$ and $P_4$ where element 17 is displaced in the subsets. An arithmetic operation between Set a and Set b of FIG. 5 cannot be performed unless processors $P_3$ and $P_4$ perform a data set communication, such as transferring element 17 from $P_3$ and $P_4$ or transferring data elements 18 from $P_4$ to $P_3$. Identical distribution requires that the corresponding elements of each data set be stored in the same processor.

The third requirement 38 (see FIG. 4) is that the sampling frequency be the same for every data set. If every element is chosen, the sampling frequency is one. If every other element is chosen, the sampling frequency is two. The sampling frequency cannot change within one subset or be different for different subsets. This is necessary because if different frequencies were allowed, the overlap requirement for different processors would also be different. While this is possible, the method described here requires that every processor have the same overlap. A simple sampling frequency comparison is sufficient for this test. An example will be discussed in detail later with respect to FIG. 6.

The fourth requirement 40 is that the product of the sampling frequency and the offset between the sampled data sets plus the difference between the starting points within each data set are less than or equal to the left-side overlap (if the sum is less than 0) or less than or equal to the right-side overlap (if the sum is greater than 0). More formally, given $$expand = (freq \times offset_{ab}) + (start - start_a) \tag{1}$$

then if $$0 \leq expand \leq overlap_{right} \tag{2}$$

or $$overlap_{left} \leq expand \leq 0 \tag{3}$$

is true, then the operation is possible (where the a and b subscripts indicate different data sets, freq is the sampling frequency, offset is the difference in position between the starting points within the sampled data sets, start is the first element respectively of the sampled data sets in each of the data sets, overlap is the data element overlap on the side indicated by the subscript for data set b).

If multiple data sets are to be combined, each set must be compared with the destination set. That is, given sampled subsets defined within data sets a, b, and c, if the result of the operation is to be stored in the locations specified by the sampled subset of a, then both b and c must be compared to a. The fourth requirement will be discussed in more detail with respect to FIGS. 7-9.

If all the conditions are satisfied the combining process such as an interpolation operation is initiated 42. It is possible that if the determination is made before the data sets are loaded that the data sets can be expanded to the appropriate size if all of the requirements have been met. This is shown by the dashed method elements of FIG. 4. In this expansion operation a determination 44 is first made as to whether expansion is possible. This is a determination as to whether the each expanded data set will fit in the available storage of the processor into which the expanded data set will be loaded. If expansion is not possible because of memory limitations once again the combining operation is stopped or not initiated 34. If the expansion is possible the data sets are expanded 46 using a conventional operation to provide an element overlap as specified by the expand value and the data sets are loaded and the process initiated 42. If the expand value is zero no expansion is necessary, if the value is positive the expansion is to the right and if negative the expansion is to the left. It is possible and may be preferable in certain circumstances to determine the largest right and left expansions and expand all data sets by that amount. Expansion in accordance with this aspect of the invention prior to starting the operation results in a more efficient operation since the overhead for communicating elements each time a need arises is reduced. For example, if one of the processors eventually will need five elements from an adjacent processor, it is more efficient to transfer all five in a single transfer than to make five transfers, that is, as each element is needed.

Figure 6:
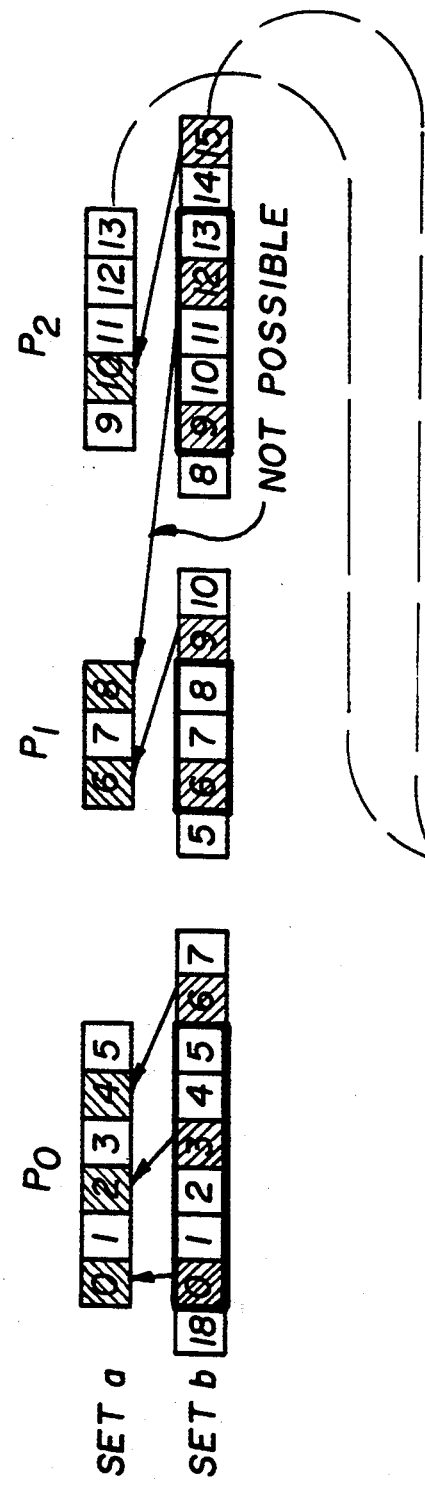
FIG. 6 depicts the problem associated with unequal sample frequencies.
Figure 6:
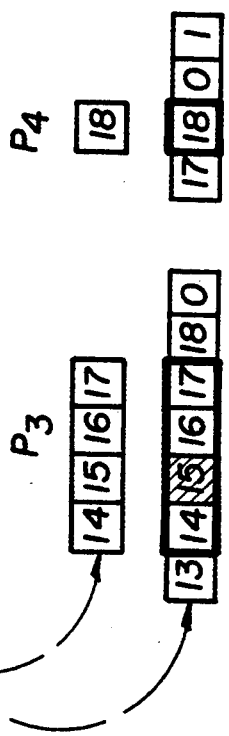

The example shown in FIG. 6 illustrates the third requirement. In this Figure, every other element of the first 10 elements of Set a is to be combined with every third element of the first 15 elements of Set b. Each subset of Set b is expanded by one element on the left and two elements on the right. The data elements to be combined are hatched and the local or original elements are marked by the darkly bordered box. The elements not in the bordered box are the elements of the expansion. By comparing the positions of the corresponding elements, it is easy to see that this operation cannot be done. Element $0_a$ can be combined with $0_b$, $2_a$ with $3_b$, $4_a$ with $6_b$, element $6_a$ can be combined with $9_b$, but $8_a$ cannot be combined with $12_a$ (where the number refers to the element position and the subscript refers to the data set) because the elements are located in different processors. As the distance between the elements to be combined becomes larger, the necessary data overlap between processors also grows larger. If the overlap is sufficient of course the operation can still proceed.

Requirement four is more complex. Given two data sets, the offset between them is the difference between the corresponding elements within the data sets which are to be combined. If the second element of one sampled data subset is to be combined with the third element of the second sampled data subset, the offset is 1. The offset is calculated with respect to the destination data subset. For example, consider two 19-element data sets from which a subset of each are to be combined. The first subset is defined as every other element from element 7 to element 15, and the second subset is defined as every other element from element 9 to element 17. If the first element of the first subset is to be combined with the second element of the second subset, the offset is 1. The difference in their starting points is 9−7=2.

However, the operation between the sampled sets just defined is not possible. Elements of the two sampled sets are stored in corresponding processors (if the second is expanded by two elements) but an offset between the two sampled, sets cannot be allowed because the sampled sets themselves are not expanded. To implement an offset function, the sampled sets would have to be redistributed as a complete data set over the processors and then expanded. If, however, each sampled set encompassed its entire data set (for example, every other element of the entire set was included, in this example the second subset would have to include element 18) the operation would be possible if the data set was appropriately expanded.

Thus there are two cases possible. The first case exists when the first element in the sampled set is within the sampling frequency distance of the first element in the data set and the sampling continues to the last element of the data set. In this case, the offset between the subsets can be greater than zero. If the sampling does not meet this restriction, the offset must be zero (although the starting points of the data subsets themselves may differ).

For example, consider the data sets distributed as shown in FIG. 7, with an overlap of one on the left and two on the right. In this Figure, every other element of Set a beginning at element 2 and ending at element 16 is to be combined with every other element of Set b beginning at element 4 and ending at element 18. The arrows pointing from each data element in Set b to the corresponding element in Set a shows that, for this case, the operation can take place, since every element in a Set has a corresponding element in Set b in the same processor. In this case, freq is 2, offset is 0, $start_a$ is 2, and $start_b$ is 4. The difference in starting points is equal to 2. The expand value is then 2 which is equal to the right side overlap so that, according to equations (1)–(3), the operation is possible.

Situations like these reduce to a very simple comparison; the overlap must be at least as large as the difference in starting points. If the difference is negative, the overlap must be on the left and if the difference is positive, the overlap must be on the right. The sampling frequency is irrelevant.

A more complex example is shown in FIG. 8. In this example, every third element of the entire set starting at element 1 comprises the first subset. The second subset is composed of every third element starting at element 2. The operation between them combines the first element of the first subset with the second element of the second subset. According to the formula, then, the expand value needed will be $(3 \times 1) + (2 - 1)$ or 4. The illustration in FIG. 8 demonstrates that this is correct. The actual elements of the sampled data sets to be combined are shown in FIG. 9. Note that the second element of Set b is combined with the first element of Set a, this difference is the offset equal to 1.

The determinations performed in accordance with the present invention can be performed prior to each data set combination operation for a series of such operations or can be performed for the operation which requires the largest subset overlap, the later being more efficient.

This method can be extended to any ring subset of any other link-connected multiprocessor, or to any higher-dimension case, specifically to two-dimensional data sets on mesh or toroidally connected multiprocessors.

The method sets out the requirements for allowing the combination of data elements sampled from data sets. If the sampled data sets can be combined without additional communication, the communication overhead in the computer can be reduced.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of combining first and second data sets in a computer system including a central processing unit and a multiprocessor having a plurality of processors connected in a ring, said central processing unit being connected to said multiprocessor by a communication channel, comprising the steps of:

(a) determining whether the first and second data sets have a same number of elements;

(b) determining whether the elements within the first and second data sets are distributed identically among the processors;

(c) determining whether sampling frequencies for the elements within the first and second data sets are the same;

(d) determining whether an overlap of the elements among said processors allows the combination of the data sets; and (e) combining the first and second data sets when the conditions determined by stems (a)–(d) are positive.

2. A method as recited in claim 1, wherein said stems (a)–(d) are performed by said central processing unit.

3. A method as recited in claim 1, wherein stem (d) further comprises:

(d1) expanding the first and second data sets to provide the overlap.

4. A method as recited in claim 1, wherein step (d) comprises:

(d1) determining $$\text{expand} = (\text{freq} \times \text{offset}_{ab}) + (\text{start}_b - \text{start}_a)$$

where expand is the amount of overlap necessary, freq is the sampling frequency, offset is the difference in position between starting points within the data sets, start is a first element of the data sets and a and b delineate the data sets;

(d2) determining $$0 \leq \text{expand} \leq \text{overlap}_{right}$$

where overlap is the amount of overlap existing in the data sets and right is a side of the overlap; and (d3) determining $$\text{overlap}_{left} \leq \text{expand} \leq 0$$

where left is another side of the overlap.

5. A method as recited in claim 4, further comprising the steps of:

(d4) expanding the data sets to the right when expand is positive and expanding the data sets to the left when expand is negative.

6. A method as recited in claim 1, wherein said steps (a)–(d) are performed by one of said processors in said multiprocessor.

7. An apparatus, comprising:

a central processing unit;

a multiprocessor comprising a plurality of ring connected processors for combining first and second data sets each having elements;

a communication channel connecting said central processing unit and said multiprocessor; and operation determination means for determining whether the combining operation can proceed, said operation determination means comprising:

size determination means for determining whether the first and second data sets have a same number of the elements;

distribution determination means for determining whether the elements of the first and second data sets are distributed identically among the processors;

sampling determination means for determining whether sampling frequencies of the combining operation for the elements of the first and second data sets are equal;

overlap determination means for determining whether an overlap of the elements among the processors allows the combining operation; and means for signaling said multiprocessor to effect said combining operation when said determinations made by said determination means are positive.

8. The apparatus claimed in claim 7, wherein said operation determination means is located in said central processing unit.

9. The apparatus claimed in claim 7, wherein said operation determination means is located in one of said processors in said multiprocessor.

10. The apparatus claimed in claim 7, wherein said overlap determination means further comprises:

means for expanding the first and second data sets to provide the overlap.

11. The apparatus claimed in claim 10, wherein said expanding means comprises:

means for determining maximum right and left side over laps; and means for expanding each subset of the data sets to provide the maximum right and left side overlaps.

12. The apparatus claimed in claim 7, wherein said overlap determining means comprises:

means for determining $$\text{expand} = (\text{freq} \times \text{offset}_{ab}) + (\text{start}_b - \text{start}_a)$$

where expand is the amount of overlap necessary, freq is the sampling frequency, offset is the difference in position between starting points within the data sets, start is a first element of the data sets and a and b delineate the data sets;

means for determining $$0 \leq \text{expand} \leq \text{overlap}_{right}$$

where overlap is the amount of overlap existing in the data sets and right is a side of the overlap; and means for determining $$\text{overlap}_{left} \leq \text{expand} \leq 0$$

where left is another side of the overlap.

13. The method claimed in claim 12, further comprising;

means for expanding the data sets to the right when expand is positive and expanding the data sets to the left when expand is negative.

* * * * *